US012724447B2

(12) United States Patent
Alvarez Gonzalez et al.

(10) Patent No.: US 12,724,447 B2
(45) Date of Patent: Sep. 1, 2026

(54) TECHNIQUES FOR CHANNEL CLOCK CONFIGURATIONS

(71) Applicant: Micron Technology, Inc., Boise, ID (US)

(72) Inventors: Marcos Alvarez Gonzalez, Munich (DE); Andrea Sorrentino, Munich (DE); Morshed Mohammed, Freising (DE); Luiza Souza Correa, Munich (DE); Wolfgang Anton Spirkl, Germering (DE); Paritosh Piyush Sahu, Munich (DE); Martin Bach, Munich (DE); Ronny Schneider, Höhenkirchen-Siegertsbrunn (DE)

(73) Assignee: Micron Technology, Inc., Boise, ID (US)

( * ) Notice: Subject to any disclaimer, the term of this patent is extended or adjusted under 35 U.S.C. 154(b) by 91 days.

(21) Appl. No.: 18/763,965

(22) Filed: Jul. 3, 2024

(65) Prior Publication Data

US 2025/0044826 A1 Feb. 6, 2025

Related U.S. Application Data

(60) Provisional application No. 63/517,611, filed on Aug. 3, 2023.

(51) Int. Cl.
*G06F 1/12* (2006.01)
*G06F 1/10* (2006.01)
*G06F 1/3203* (2019.01)

(52) U.S. Cl.
CPC .............. *G06F 1/10* (2013.01); *G06F 1/3203* (2013.01)

(58) Field of Classification Search
CPC ........................................................ G06F 1/10
USPC ......................................................... 713/600
See application file for complete search history.

(56) References Cited

U.S. PATENT DOCUMENTS 11,217,285 B1 * 1/2022 Jeter .................... G06F 13/1689
12,271,220 B1 * 4/2025 Carlson ...................... G06F 1/10
2007/0083800 A1 * 4/2007 LaBerge .......... G11C 29/56004 714/718
2007/0280032 A1 * 12/2007 Kwak ...................... G11C 8/10 365/233.5
2014/0241074 A1 * 8/2014 Chen .................... G11C 29/023 365/189.07
2017/0017587 A1 * 1/2017 West ................... G06F 13/4068
2017/0053711 A1 * 2/2017 Shibata ............ G11C 29/56012
(Continued)

*Primary Examiner* — Volvick Derose
(74) *Attorney, Agent, or Firm* — Holland & Hart LLP

(57) ABSTRACT

Methods, systems, and devices for techniques for coupled host and memory dies are described. As part of a low-speed testing phase of a memory system, a low-speed tester may measure the change in phase of a set of clock signals in response to a change in a configuration of the memory system. For example, the low-speed tester may communicate with a mimic circuit of the memory system to determine a first frequency of a first clock signal of the multi-phase clock associated with a first configuration of the memory system and determine a second frequency of the first clock signal associated with a second configuration of the memory system. The low-speed tester may store an indication of the difference between the first frequency and the second frequency, and a high-speed tester may use the difference as part of selecting a set of trim parameters for the multi-phase clock signal.

20 Claims, 6 Drawing Sheets

(56) References Cited

U.S. PATENT DOCUMENTS

| | | | | |
|---|---|---|---|---|
| 2018/0247683 | A1* | 8/2018 | Lee | G11C 7/222 |
| 2020/0192570 | A1* | 6/2020 | Giaccio | G06F 3/0679 |
| 2020/0227130 | A1* | 7/2020 | Kim | G11C 7/222 |
| 2020/0233592 | A1* | 7/2020 | Kim | G06F 3/0625 |
| 2020/0312399 | A1* | 10/2020 | Brox | H03K 3/017 |
| 2021/0312972 | A1* | 10/2021 | Kumar | G11C 11/4072 |
| 2023/0326514 | A1* | 10/2023 | Ayyapureddi | G11C 7/1093 |
| 2024/0203469 | A1* | 6/2024 | Kang | G11C 7/1057 |

* cited by examiner

TECHNIQUES FOR CHANNEL CLOCK CONFIGURATIONS

CROSS REFERENCE

The present application for patent claims priority to U.S. Patent Application No. 63/517,611 by Gonzalez et al., entitled "TECHNIQUES FOR CHANNEL CLOCK CONFIGURATIONS," filed Aug. 3, 2023, which is assigned to the assignee hereof, and which is expressly incorporated by reference in its entirety herein.

TECHNICAL FIELD

The following relates to one or more systems for memory, including techniques for channel clock configurations.

BACKGROUND

Memory devices are used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored by the memory cell. To store information, a memory device may write (e.g., program, set, assign) states to the memory cells. To access stored information, a memory device may read (e.g., sense, detect, retrieve, determine) states from the memory cells.

BRIEF DESCRIPTION OF THE DRAWINGS

FIG. 6 shows a flowchart illustrating a method or methods that support techniques for channel clock configurations in accordance with examples as disclosed herein.

DETAILED DESCRIPTION

In some cases, a memory system may generate a multi-phase high frequency clock signal using a relatively lower frequency signal to support communications between the memory system and a host system. For example, the memory system may generate the multi-phase clock signal by modifying the frequency of an input clock signal and applying a set of phase offsets to the modified clock signal to generate a corresponding set of clock signals. The memory system may combine the set of clock signals to form the multi-phase clock signal, which may have an increased effective frequency. However, differences in phase or frequency of the set of clock signals may lead to distortion in the multi-phase clock signal, which may decrease signal quality. In some cases, a high-speed tester may determine a set of trim parameters for the multi-phase clock to mitigate the distortion using a set of pre-determined (e.g., hard-coded) values which indicate a change in phase of the set of clock signals in response to a change in a configuration of an average memory system. However, the response of some memory systems may fall outside of the average range indicated by the pre-determined values, which may decrease the ability of the high-speed tester to determine the set of trim parameters to mitigate distortion, thus reducing performance of the memory system.

As described herein, as part of a low-speed testing phase of a memory system, a low-speed tester may measure the change in phase of a set of clock signals in response to a change in a configuration of the memory system. For example, the low-speed tester may communicate with a mimic circuit of the memory system to determine a first frequency of a first clock signal of the multi-phase clock associated with a first configuration of the memory system and determine a second frequency of the first clock signal associated with a second configuration of the memory system. The low-speed tester may store an indication of the difference between the first frequency and the second frequency, and a high-speed tester may use the difference as part of selecting a set of trim parameters for the multi-phase clock signal. Such techniques may mitigate distortion within the multi-phase clock signal, which may improve signal integrity and thus improve system performance.

Features of the disclosure are illustrated and described in the context of systems and architectures. Features of the disclosure are further illustrated and described in the context of clock signal graphs, distortion graphs, timing diagrams, clock circuits, and flowcharts.

Figure 1:
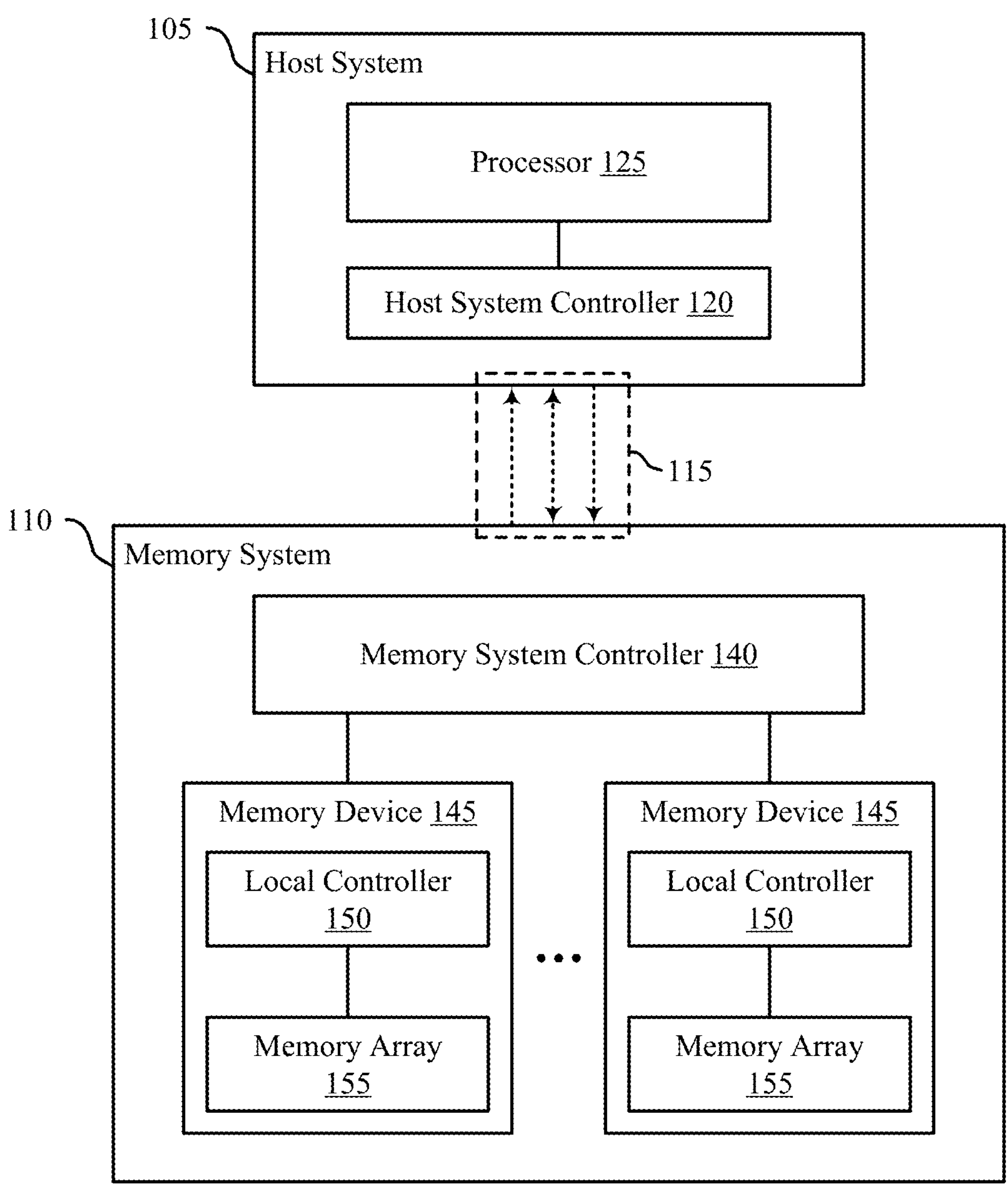
FIG. 1 shows an example of a system that supports techniques for channel clock configurations in accordance with examples as disclosed herein.

FIG. 1 illustrates an example of a system 100 that supports techniques for channel clock configurations in accordance with examples as disclosed herein. The system 100 may include portions of an electronic device, such as a computing device, a mobile computing device, a wireless communications device, a graphics processing device, a vehicle, a smartphone, a wearable device, an internet-connected device, a vehicle controller, a system on a chip (SoC), or other stationary or portable electronic system, among other examples. The system 100 includes a host system 105, a memory system 110, and one or more channels 115 coupling the host system 105 with the memory system 110 (e.g., to support a communicative coupling). The system 100 may include any quantity of one or more memory systems 110 coupled with the host system 105.

The host system 105 may include one or more components (e.g., circuitry, processing circuitry, a processing component) that use memory to execute processes, any one or more of which may be referred to as or be included in a processor 125. The processor 125 may include at least one of one or more processing elements that may be co-located or distributed, including a general-purpose processor, a digital signal processor (DSP), an application-specific integrated circuit (ASIC), a field-programmable gate array (FPGA) or other programmable logic device, a controller, discrete gate or transistor logic, one or more discrete hardware components, or a combination thereof. The processor 125 may be an example of a central processing unit (CPU), a graphics processing unit (GPU), a general-purpose GPU (GPGPU), or an SoC or a component thereof, among other examples.

The host system 105 may also include at least one of one or more components (e.g., circuitry, logic, instructions) that implement the functions of an external memory controller (e.g., a host system memory controller), which may be referred to as or be included in a host system controller 120. For example, a host system controller 120 may issue commands or other signaling for operating the memory system 110, such as write commands, read commands, configuration signaling or other operational signaling. In some examples, the host system controller 120, or associated functions described herein, may be implemented by or be part of the processor 125. For example, a host system controller 120 may be hardware, instructions (e.g., software, firmware), or some combination thereof implemented by the processor 125 or other component of the host system 105. In various examples, a host system 105 or a host system controller 120 may be referred to as a host.

The memory system 110 provides physical memory locations (e.g., addresses) that may be used or referenced by the system 100. The memory system 110 may include a memory system controller 140 and one or more memory devices 145 (e.g., memory packages, memory dies, memory chips) operable to store data. The memory system 110 may be configurable for operations with different types of host systems 105, and may respond to commands from the host system 105 (e.g., from a host system controller 120). For example, the memory system 110 (e.g., a memory system controller 140) may receive a write command indicating that the memory system 110 is to store data received from the host system 105, or receive a read command indicating that the memory system 110 is to provide data stored in a memory device 145 to the host system 105, or receive a refresh command indicating that the memory system 110 is to refresh data stored in a memory device 145, among other types of commands and operations.

A memory system controller 140 may include at least one of one or more components (e.g., circuitry, logic, instructions) operable to control operations of the memory system 110. A memory system controller 140 may include hardware or instructions that support the memory system 110 performing various operations, and may be operable to receive, transmit, or respond to commands, data, or control information related to operations of the memory system 110. A memory system controller 140 may be operable to communicate with one or more of a host system controller 120, one or more memory devices 145, or a processor 125. In some examples, a memory system controller 140 may control operations of the memory system 110 in cooperation with the host system controller 120, a local controller 150 of a memory device 145, or any combination thereof. Although the example of memory system controller 140 is illustrated as a separate component of the memory system 110, in some examples, aspects of the functionality of the memory system 110 may be implemented by a processor 125, a host system controller 120, at least one of one or more local controllers 150, or any combination thereof.

Each memory device 145 may include a local controller 150 and one or more memory arrays 155. A memory array 155 may be a collection of memory cells (e.g., a two-dimensional array, a three-dimensional array), with each memory cell being operable to store data (e.g., as one or more stored bits). Each memory array 155 may include memory cells of various architectures, such as random access memory (RAM) cells, dynamic RAM (DRAM) cells, synchronous dynamic RAM (SDRAM) cells, static RAM (SRAM) cells, ferroelectric RAM (FeRAM) cells, magnetic RAM (MRAM) cells, resistive RAM (RRAM) cells, phase change memory (PCM) cells, chalcogenide memory cells, not-or (NOR) memory cells, and not-and (NAND) memory cells, or any combination thereof.

A local controller 150 may include at least one of one or more components (e.g., circuitry, logic, instructions) operable to control operations of a memory device 145. In some examples, a local controller 150 may be operable to communicate (e.g., receive or transmit data or commands or both) with a memory system controller 140. In some examples, a memory system 110 may not include a memory system controller 140, and a local controller 150 or a host system controller 120 may perform functions of a memory system controller 140 described herein. In some examples, a local controller 150, or a memory system controller 140, or both may include decoding components operable for accessing addresses of a memory array 155, sense components for sensing states of memory cells of a memory array 155, write components for writing states to memory cells of a memory array 155, or various other components operable for supporting described operations of a memory system 110.

A host system 105 (e.g., a host system controller 120) and a memory system 110 (e.g., a memory system controller 140) may communicate information (e.g., data, commands, control information, configuration information) using one or more channels 115. Each channel 115 may be an example of a transmission medium that carries information, and each channel 115 may include one or more signal paths (e.g., a transmission medium, an electrical conductor, a conductive path) between terminals (e.g., nodes, pins, contacts) associated with the components of the system 100. A terminal may be an example of a conductive input or output point of a device of the system 100, and a terminal may be operable as part of a channel 115. To support communications over channels 115, a host system 105 (e.g., a host system controller 120) and a memory system 110 (e.g., a memory system controller 140) may include receivers (e.g., latches) for receiving signals, transmitters (e.g., drivers) for transmitting signals, decoders for decoding or demodulating received signals, or encoders for encoding or modulating signals to be transmitted, among other components that support signaling over channels 115, which may be included in a respective interface portion of the respective system.

A channel 115 be dedicated to communicating one or more types of information, and channels 115 may include unidirectional channels, bidirectional channels, or both. For example, the channels 115 may include one or more command and address channels, one or more clock signal channels, one or more data channels, among other channels or combinations thereof. In some examples, a channel 115 may be configured to provide power from one system to another (e.g., from the host system 105 to the memory system 110, in accordance with a regulated voltage). In some examples, at least a subset of channels 115 may be configured in accordance with a protocol (e.g., a logical protocol, a communications protocol, an operational protocol, an industry standard), which may support configured operations of and interactions between a host system 105 and a memory system 110.

A clock signal channel may be operable to communicate one or more clock signals between the host system 105 and the memory system 110. Clock signals may oscillate between a high state and a low state, and may support coordination (e.g., in time) between operations of the host system 105 and the memory system 110. In some examples, a clock signal may provide a timing reference for operations of the memory system 110. A clock signal may be referred to as a control clock signal, a command clock signal, or a system clock signal. A system clock signal may be generated by a system clock, which may include one or more hardware components (e.g., oscillators, crystals, logic gates, transistors).

Signaling may be communicated over the channels 115 using single data rate (SDR) signaling or double data rate (DDR) signaling, among other rates (e.g., relative to a clock signal). In SDR signaling, one modulation symbol (e.g., signal level) of a signal may be registered for each clock cycle (e.g., on a rising edge or a falling edge of a clock signal). In DDR signaling, two modulation symbols of a signal may be registered for each clock cycle (e.g., on both a rising edge and a falling edge of a clock signal).

In some cases, as part of a low-speed testing phase of a memory system 110, a low-speed tester may measure the change in phase of a set of clock signals in response to a change in a configuration of the memory system 110. For example, the low-speed tester may communicate with a mimic circuit of the memory system 110 to determine a first frequency of a first clock signal of the multi-phase clock associated with a first configuration of the memory system 110 and determine a second frequency of the first clock signal associated with a second configuration of the memory system 110. The low-speed tester may store an indication of the difference between the first frequency and the second frequency, and a high-speed tester may use the difference as part of selecting a set of trim parameters for the multi-phase clock signal. Such techniques may mitigate distortion within the multi-phase clock signal, which may improve signal integrity and thus improve system performance.

In addition to applicability in systems as described herein, techniques for channel clock configuration may be generally implemented to improve the performance (including gaming) of various electronic devices and systems. Some electronic device applications, including gaming and other high-performance applications, may be associated with relatively high processing requirements while also benefitting from relatively quick response times to improve user experience. As such, increasing processing speed, decreasing response times, or otherwise improving the performance electronic devices may be desirable. Implementing the techniques described herein may improve the performance of electronic devices by mitigating distortion in a multi-phase clock signal, which may improve signal integrity and speed, decrease processing or latency times, improve response times, or otherwise improve user experience, among other benefits.

Figure 2A:
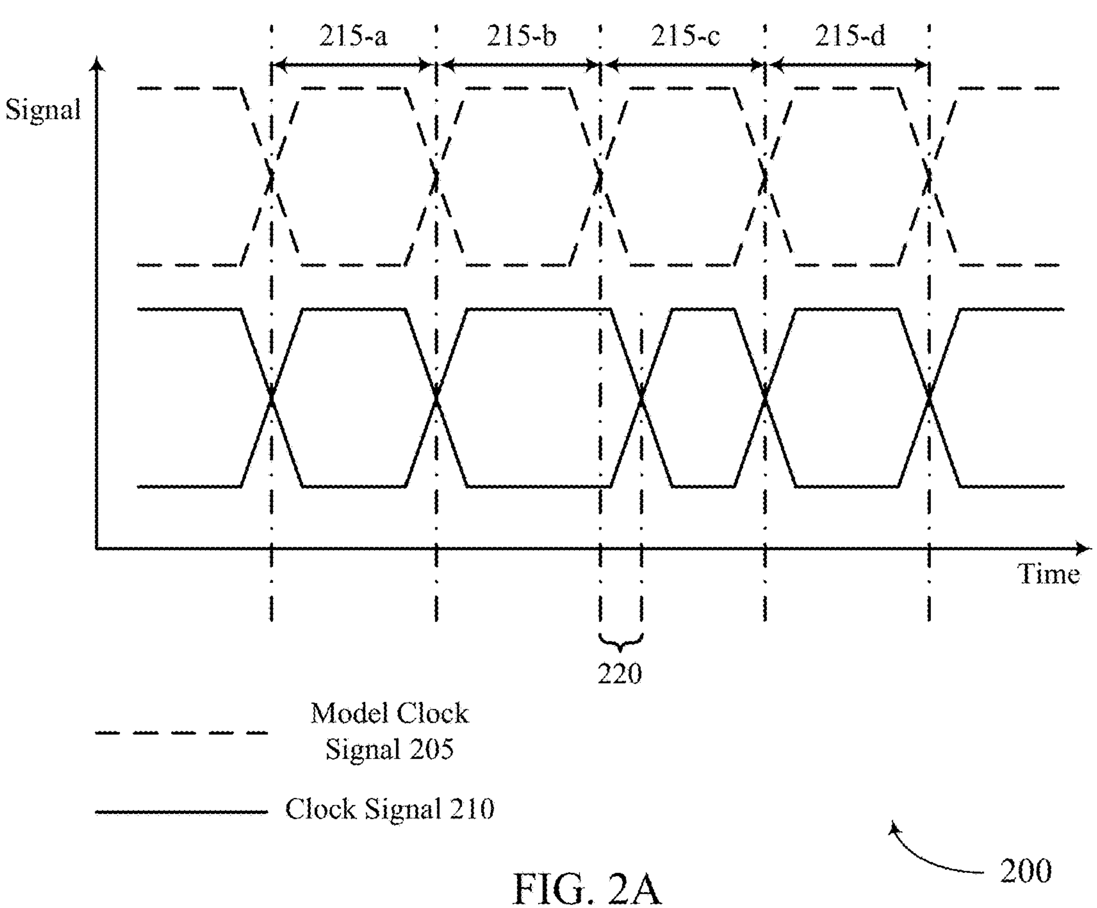
FIGS. 2A and 2B show examples of a clock signal graph and a distortion graph that support techniques for channel clock configurations in accordance with examples as disclosed herein.
Figure 2B:
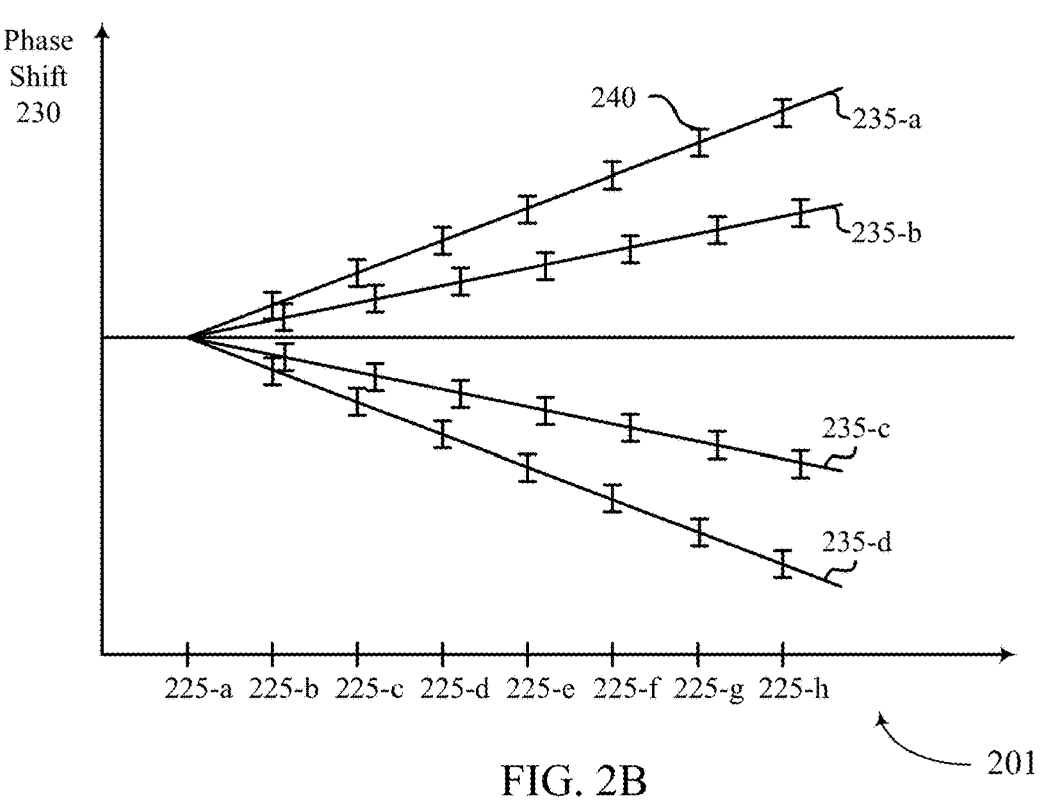

FIGS. 2A and 2B show examples of a clock signal graph 200 and a distortion graph 201 that support techniques for channel clock configurations in accordance with examples as disclosed herein. The clock signal graph 200 may illustrate a multi-phase clock signal implemented by a memory system to support communications between the memory system and a host system.

In some cases, the memory system may generate the multi-phase clock signal by combining (e.g., superimposing) multiple lower-frequency clock signals, as described in greater detail with reference to FIG. 3. The multi-phase clock signal may include multiple clock cycles, which may each correspond to a respective duration 215 associated with communicating data in the respective clock cycle. For example, the multi-phase clock signal illustrated in the clock signal graph 200 may have four clock cycles (e.g., corresponding to the four clock signals used to generate the multi-phase clock signal), including a first clock cycle having a first duration 215-*a*, a second clock cycle having a second duration 215-*b*, a third clock cycle having a third duration 215-*c*, and a fourth clock cycle having a fourth duration 215-*d*.

The clock signal graph 200 may include a model clock signal 205, which may illustrate a hypothetical or idealized clock signal in which each clock cycle of the model clock signal corresponds to an equal duration, and a clock signal 210, which may represent a clock signal of a physical memory system. Because of differences in phase or frequency (or both) of the clock signals used to generate the clock signal 210, clock cycles of the clock signal 210 may be different than clock cycles of the model clock signal 205. For example, there may be a phase mismatch 220 between a clock cycle of the model clock signal 205 and a corresponding clock cycle of the clock signal 210. In some cases, the combination (e.g., the sum) of phases mismatches 220 of a multi-phase clock signal may be referred to as the distortion of the multi-phase clock signal. Because communications between the host system and the memory system, such as commands (e.g., write commands, read commands, training commands) and data associated with the commands, may be executed in accordance with the multi-phase clock signal, mitigating the distortion may improve signal integrity of such communications may improve system performance.

Because the distortion of the multi-phase clock signal may result from differences in phase of the signals used to generate the multi-phase clock signal, the memory system may configure circuitry associated with the multi-phase clock signal to mitigate the distortion. In some examples, the memory system may support multiple configurations 225 (e.g., configurations 225-*a* through 225-*h*), which may each correspond to a respective set of parameters, such as trim parameters, fuse-level configurations, or other settings.

The distortion graph 201 may illustrate a modeled phase shift 230 for each of a set of clock signals 235 in accordance with each configuration 225. For example, the distortion graph 201 may depict a first phase shift for a first clock signal 235-*a*, a second phase shift for a second clock signal 235-*b*, a third phase shift for a third clock signal 235-*c*, and a fourth phase shift for a first clock signal 235-*d*. The modeled phase shift 230 for each clock signal 235 may represent an average phase shift for a large yield of memory systems. However, because the behavior of a particular memory system many depend on system-parameters (e.g., manufacturing differences between memory systems), the phase shift of a particular clock signal 235 of a memory system may fall within a distribution 240 of possible values.

In some examples, as part of manufacturing and testing of a memory system, a high-speed tester may mitigate distortion by selecting a set of trim parameters for the multi-phase clock. Such a selection may depend on features of the distortion graph 201, such as the rate of change of the phase shift 230 with respect to the configuration 225. Some high-speed testers may use pre-determined (e.g., hard-coded) values to represent such a rate of change. However, because the rate of change may be different for each memory system (e.g., if a memory system falls within an upper or lower end of the distribution 240), using such pre-determined values may decrease the ability of the high-speed tester to determine the set of trim parameters to mitigate distortion, thus reducing performance of the memory system.

Additionally, using a high-speed tester may be relatively expensive or include relatively more overhead and complexity compared with using a low-speed tester. For example, a high-speed tester may, in some cases, couple with a native interface of a memory system, which may be performed after packaging one or more memory devices within the memory system. Alternatively, a low-speed tester may couple with other components of the memory prior to packaging, such as a testing interface, which may support lower-speed communications with a testing device.

In some cases, as part of the manufacturing and testing of the memory system, a low-speed tester may be used to determine the rate of change of the phase shift 230 for a particular memory system, which may mitigate distortion within the multi-phase clock signal and may thus improve signal integrity and improve system performance. For example, the low-speed tester may communicate with a mimic circuit of the memory system (e.g., using a testing interface) to determine a first frequency of a clock signal 235 of the multi-phase clock associated with a first configuration 225 of the memory system and determine a second frequency of the clock signal 235 associated with a second configuration 225 of the memory system. The low-speed tester may store an indication of the difference between the first frequency and the second frequency, and a high-speed tester may use the difference as part of selecting the set of trim parameters for the multi-phase clock signal. In some examples, the mimic circuit may be manufactured in a same or similar environment (e.g., as part of a same manufacturing step) as circuits associated with communication over the bus of the memory system. Accordingly, physical characteristics of the mimic circuit, such as the rate of change of the phase shift, may be similar or related to the physical characteristics of the circuits associated with communication over the bus of the memory system.

Figure 3:
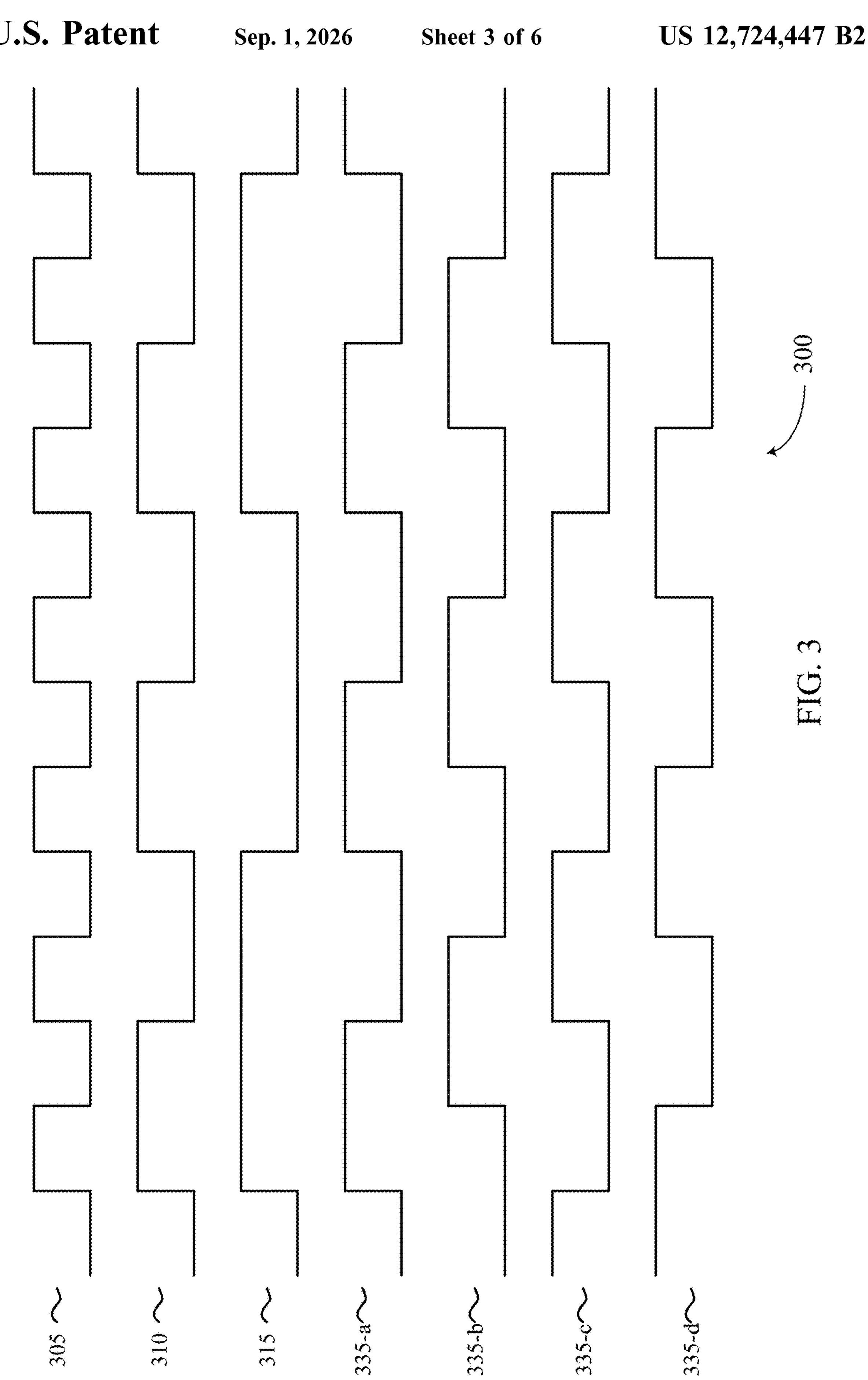
FIG. 3 shows an example of a timing diagram that supports techniques for channel clock configurations in accordance with examples as disclosed herein.

FIG. 3 shows an example of a timing diagram 300 that supports techniques for channel clock configurations in accordance with examples as disclosed herein. The timing diagram 300 may illustrate a set of clock signals used by a memory system (e.g., a memory system 110) to support communication with a host system. The timing diagram 300 may include a write clock signal 305, a first modified clock signal 310, a second modified clock signal 315, and a set clock signals 335 of a multi-phase clock, including a clock signal 335-*a*, and clock signal 335-*b*, a clock signal 335-*c*, and a clock signal 335-*d*.

A host system may supply the write clock signal 305 to the memory system (e.g., using a clock channel 115). The write clock signal 305 may be an example of a relatively high frequency clock signal, which may support increased transmission speeds between the host system and the memory system. However, using such a high frequency clock signal for operations internal to the memory system may introduce challenges, such as increased manufacturing cost of circuitry for the memory system capable of operating at the high frequency. Accordingly, a memory system may include circuitry to modify the received write clock signal 305, such as circuitry to reduce the frequency of the write clock signal 305 by a factor to generate the first modified clock signal 310 (e.g., by reducing the frequency of the write clock signal 305 by a factor of two), the second modified clock signal 315 (e.g., by reducing the frequency of the write clock signal 305 by a factor of four), or both.

In some cases, the memory system may generate a multi-phase clock to support operations in accordance with the write clock signal 305, such as transmitting data (e.g., read data) to the host system. For example, the memory system may generate the set of clock signals 335 by applying a set of phase shifts to the first modified signal 310. By way of example, the memory system may not apply a phase shift to the first modified signal 310 to generate the clock signal 335-*a*, may apply a first phase shift (e.g., a 0-degree phase shift) to the first modified signal 310 to generate the clock signal 335-*a*, may apply a second phase shift (e.g., a 90-degree phase shift) to the first modified signal 310 to generate the clock signal 335-*b*, may apply a third phase shift (e.g., a 180-degree phase shift) to the first modified signal to generate the clock signal 335-*c*, and may apply a fourth phase shift (e.g., a 270-degree phase shift) to the first modified signal 310 to generate the clock signal 335-*d*.

As illustrated in FIG. 3, a rising edge of each of the clock signals 335 may correspond to a rising or falling edge of the write clock signal 305, which may support the memory system in operating in accordance with the write clock signal 305. For example, the duration between a rising edge of the clock signal 335-*a* and a rising edge of the clock signal 335-*b* may correspond to the duration 215-*a* of a clock cycle of the clock signal 210.

In some cases, discrepancies may occur in the magnitudes of the set of phase shifts, for example due to manufacturing variations for a particular memory system. The size of such discrepancies may depend on a configuration (e.g., a configuration 225) of the memory system. For example, the distortion graph 201 may illustrate the discrepancy (e.g., the phase shift 230) for each clock signal 335 as a function of the supported set of configurations 225 of the memory system.

In some examples, as part of manufacturing and testing of the memory system, a high-speed tester may "tune" the discrepancies to mitigate distortion by selecting a set of trim parameters for the multi-phase clock. In some cases, the high-speed tester may perform such a tuning for multiple granularities of signal paths of the memory system.

However, as discussed with reference to FIG. 2B, the change in discrepancy of clock signals 335 in a particular memory system may deviate from a pre-determined average change used in some high-speed testers. Accordingly, a low-speed tester may be used to determine the change in discrepancy of clock signals 335 of a particular memory system, which may mitigate distortion within the multi-phase clock signal and may thus improve signal integrity and improve system performance. For example, the low-speed tester may communicate with a mimic circuit of the memory system to determine a first frequency of a clock signal 335 of the multi-phase clock associated with a first configuration of the memory system and determine a second frequency of the clock signal 335 associated with a second configuration of the memory system. The low-speed tester may store an indication of the difference between the first frequency and the second frequency, and a high-speed tester may use the difference as part of selecting the set of trim parameters for the multi-phase clock signal.

Figure 4:
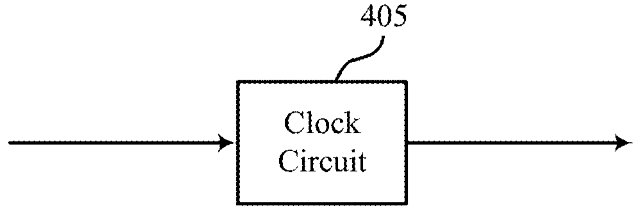
FIG. 4 shows an example of clock circuits that support techniques for channel clock configurations in accordance with examples as disclosed herein.
Figure 4:
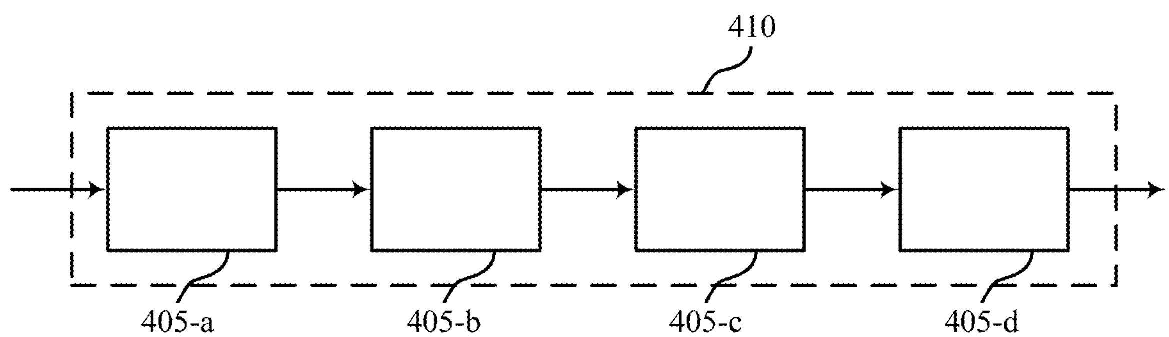

FIG. 4 shows an example of clock circuits 400 that supports techniques for channel clock configurations in accordance with examples as disclosed herein. The clock circuits 400 may include a clock circuit 405 and a mimic circuit 410. In some examples, a memory system may implement a clock circuit 405 to support communication over a bus of the memory system. For example, the clock circuit 405 may include circuitry operable to transmit signaling to or receive signaling from (or both) a separate device, such as a host system, a high-speed tester, or both.

The clock circuit 405 may support communication in accordance with a high-frequency clock signal, such as the write clock signal 305 as described with reference to FIG. 3. For example, the clock circuit 405 may implement a multi-phase clock (e.g., as described with reference to FIGS. 2A, 2B and 3) using a set of clock signals (e.g., clock signal 235, clock signals 335). Accordingly, the memory system may configure the clock circuit 405 in accordance with a set of trim parameters, which may mitigate distortion associated with the clock circuit 405.

The mimic circuit 410 may support communication in accordance with a low-frequency clock signal, such as a clock signal used by a low-speed tester. In some examples, the mimic circuit 410 may be an example of testing circuitry, such as a design for testability (DFT) circuit, which may be used as part of a low-speed testing phase of a memory device.

The mimic circuit 410 may be configured to simulate the behavior of a clock circuit 405 while operating at a lower frequency than the clock circuit 405. For example, the mimic circuit 410 may include multiple clock circuits 405 (e.g., a clock circuit 405-*a*, a clock circuit 405-*b*, a clock circuit 405-*c*, and a clock circuit 405-*d*) connected in series, which may reduce the frequency of a signal input to the mimic circuit 410 by a factor (e.g., commensurate with the quantity of clock circuits 405 included in the mimic circuit 410). Because the mimic circuit 410 may include multiple clock circuits 405, the mimic circuit 410 may model a data path and load of a clock circuit 405. Additionally, the memory system may be operable to apply a set of trim parameters to the mimic circuit 410, which may allow a configuration for a clock circuit 405 to be applied to the mimic circuit 410 and may allow a configuration for the mimic circuit 410 to be applied to the clock circuit 405.

In some examples, the memory system may operate the mimic circuit 410 using one or more commands from a low-speed tester. For example, the memory system may support a first command to activate an oscillator (e.g., an oscillator associated with clock signals, such as clock signals 235, clock signals 335, or both) of the mimic circuit 410 and second command to deactivate the oscillator. In some cases, the mimic circuit may include a counter, which may track a quantity of oscillations of the oscillator between activating and deactivating the oscillator. In such cases, the memory system may support a third command to transmit an indication of a value of the counter to the low-speed tester.

Figure 5:
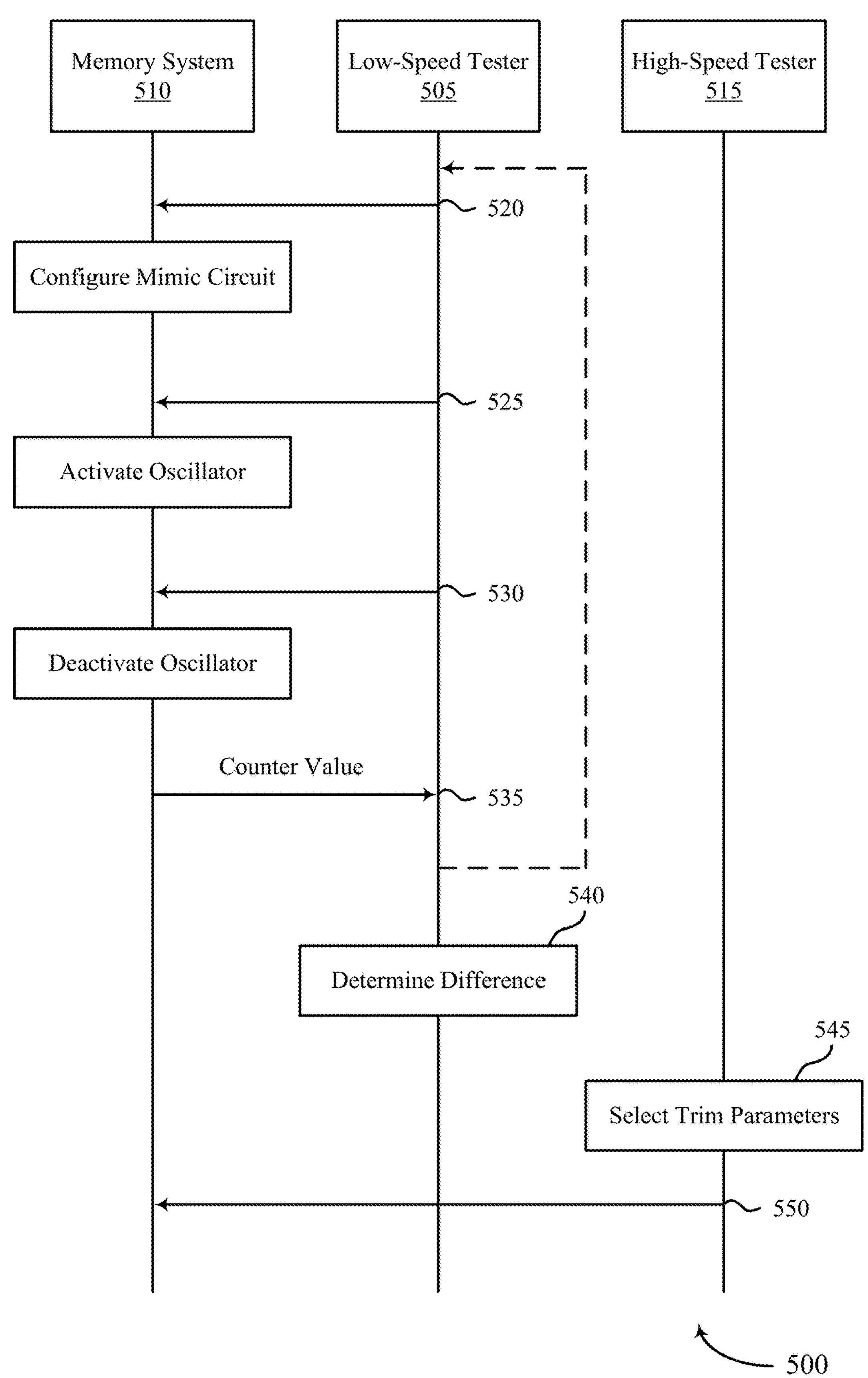
FIG. 5 shows an example of a process flow that supports techniques for channel clock configurations in accordance with examples as disclosed herein.

FIG. 5 shows an example of a process flow 500 that supports techniques for channel clock configurations in accordance with examples as disclosed herein. In some examples, a memory system 510, which may be an example of the memory system 110 as described with reference to FIG. 1, may implement aspects of the process flow 500 using a memory system controller (e.g., a memory system controller 140), a clock circuit 405, a mimic circuit 410, or a combination thereof. Additionally, one or more testers may implement aspects of the process flow 500, such as a low-speed tester 505 and a high-speed tester 515. In the following description of process flow 500, the operations may be performed in a different order than the order shown. For example, specific operations may also be left out of process flow 500, or other operations may be added to process flow 500.

The process flow 500 may illustrate a method to measure a rate of change of the phase shift of a set of clock signals of a multi-phase clock (e.g., a distortion graph 201) for a particular memory system using the low-speed tester 505 and use the modeled phase shift to select a set of trim parameters for the memory system using the high-speed tester 515. The memory system may undergo multiple testing phases, such as a low-speed testing phase in which the low-speed tester 505 is configured to communicate with the memory system 510 (e.g., over a bus) and a high-speed testing phase in which the high-speed tester 515 is configured to communicate with the memory system 510 (e.g., over the bus). Using measured rate of change of the phase shift to select the set of trim parameters may allow the high-speed tester 515 to mitigate distortion more effectively, which may improve signal integrity and thus improve system performance.

For example, as part of the low-speed testing phase, the low-speed tester 505 may, at 520, transmit a command to the memory system 510 to configure the mimic circuit according a first configuration. At 525, the low-speed tester 505 may transmit a command (e.g., a start pulse) at a first time to activate an oscillator of the mimic circuit, such as an oscillator associated with a clock signal of the multi-phase clock. In some examples, the mimic circuit may include or may be associated with counter, which may track a quantity of oscillations of the oscillator between activating and deactivating the oscillator.

At 530, the low-speed tester 505 may transmit a command (e.g., a stop pulse) at a second time to deactivate the oscillator, and the low-speed tester 505 may, at 535, read the value of the counter. For example, the low-speed tester 505 may transmit a read command for the counter to the memory system 510, and the memory system 510 may transmit the value of the counter to the low-speed tester. The low-speed tester 505 may use the counter value, as well as the difference between the first time and the second time (e.g., the duration in which the oscillator was active) to determine a first frequency of the oscillator associated with the first configuration, such as by dividing the value of the counter by the duration.

In some examples, the low-speed tester 505 may repeat steps 520 through 535 to determine a second frequency of the oscillator associated with a second configuration. For example, the low-speed tester 505 may transmit a command to the memory system 510 to configure the mimic circuit according the second configuration. The low-speed tester 505 may transmit a command (e.g., a start pulse) at a third time to activate the oscillator, and may transmit a command (e.g., a stop pulse) at a fourth time to deactivate the oscillator. The low-speed tester 505 may read the value of the counter from the memory system 510 and may use the value of the counter, as well as the difference between the third time and the fourth time, to determine the second frequency.

At 540, the low-speed tester 505 may determine the difference between the first frequency and the second frequency, and may store an indication of the difference. In some examples, the difference between the first frequency and the second frequency may correspond to or may be associated with the rate of change of the phase shift of a set of clock signals of the multi-phase clock, and thus may more accurately represent the characteristics of the memory system 510 (e.g., compared with a pre-determined distortion graph 201). Accordingly, as part of the high-speed testing phase, the high-speed tester 515 may, at 545, use the difference between the first frequency and the second frequency to select a set of trim parameters which mitigate distortion for the memory system 510. In some cases, the high-speed tester 515 may select a respective set of trim parameters for each conductive path of the bus of the memory system 510. Additionally, or alternatively, the high-speed tester 515 may select a set of trim parameters for other granularities of conductive paths of the bus, such as a respective set of trim parameters for each nibble of the bus, a respective set of trim parameters for each channel of the bus, or both.

In some examples, at 550, the high-speed tester 515 may provide or otherwise make the set of trim parameters available to the memory system 510. In such examples, the memory system 510 may configure one or more clock circuits (e.g., clock circuits 405) according to the set of trim parameters, and may communicate (e.g., with a host system) via the bus using the configured clock circuits.

Figure 6:
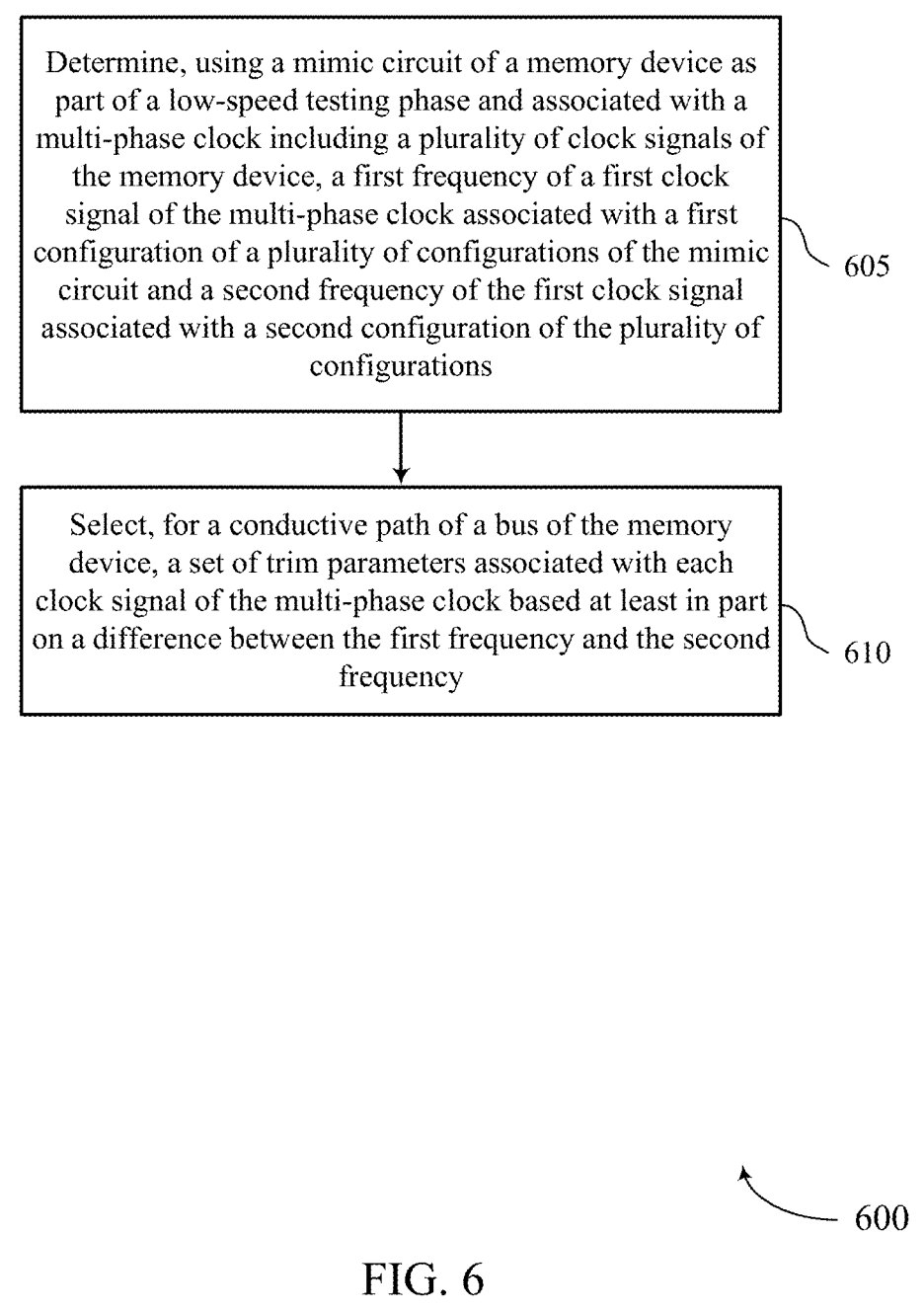

FIG. 6 shows a flowchart illustrating a method 600 that supports techniques for channel clock configurations in accordance with examples as disclosed herein. The operations of method 600 may be implemented by a memory device testing system or its components as described herein. For example, the operations of method 600 may be performed by a memory device testing system as described with reference to FIGS. 1 through 5. In some examples, a memory device testing system may execute a set of instructions to control the functional elements of the device to perform the described functions. Additionally, or alternatively, the memory device testing system may perform aspects of the described functions using special-purpose hardware.

At 605, the method may include determining, using a mimic circuit of a memory device as part of a low-speed testing phase and associated with a multi-phase clock including a plurality of clock signals of the memory device, a first frequency of a first clock signal of the multi-phase clock associated with a first configuration of a plurality of configurations of the mimic circuit and a second frequency of the first clock signal associated with a second configuration of the plurality of configurations.

At 610, the method may include selecting, for a conductive path of a bus of the memory device, a set of trim parameters associated with each clock signal of the multi-phase clock based at least in part on a difference between the first frequency and the second frequency.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for determining, using a mimic circuit of a memory device as part of a low-speed testing phase and associated with a multi-phase clock including a plurality of clock signals of the memory device, a first frequency of a first clock signal of the multi-phase clock associated with a first configuration of a plurality of configurations of the mimic circuit and a second frequency of the first clock signal associated with a second configuration of the plurality of configurations and selecting, for a conductive path of a bus of the memory device, a set of trim parameters associated with each clock signal of the multi-phase clock based at least in part on a difference between the first frequency and the second frequency.

Aspect 2: The method, apparatus, or non-transitory computer-readable medium of aspect 1, further including operations, features, circuitry, logic, means, or instructions, or any combination thereof for communicating via the bus of the memory device using a clock circuit different than the mimic circuit, the clock circuit configured using the set of trim parameters.

Aspect 3: The method, apparatus, or non-transitory computer-readable medium of aspect 2, where the mimic circuit includes a plurality of circuits configured to implement the multi-phase clock.

Aspect 4: The method, apparatus, or non-transitory computer-readable medium of any of aspects 1 through 3, further including operations, features, circuitry, logic, means, or instructions, or any combination thereof for storing an indication of the difference, where selecting the set of trim parameters is based at least in part on storing the indication.

Aspect 5: The method, apparatus, or non-transitory computer-readable medium of any of aspects 1 through 4, where determining the first frequency includes operations, features, circuitry, logic, means, or instructions, or any combination thereof for configuring the mimic circuit according the first configuration; transmitting, by a tester coupled with the bus of the memory device and based at least in part on the configuring, a first command at a first time to activate the first clock signal; transmitting, by the tester, a second command at a second time after the first time to deactivate the first clock signal; and identifying a quantity of oscillations of the first clock signal, where the first frequency is based at least in part of the quantity of oscillations and a difference between the first time and the second time.

Aspect 6: The method, apparatus, or non-transitory computer-readable medium of any of aspects 1 through 5, where the set of trim parameters includes a third configuration of the plurality of configurations.

Aspect 7: The method, apparatus, or non-transitory computer-readable medium of any of aspects 1 through 6, further including operations, features, circuitry, logic, means, or instructions, or any combination thereof for performing a high-speed testing phase for the memory device to determine the set of trim parameters, where selecting the set of trim parameters is based at least in part on the performing.

Aspect 8: The method, apparatus, or non-transitory computer-readable medium of any of aspects 1 through 7, further including operations, features, circuitry, logic, means, or instructions, or any combination thereof for receiving a second clock signal from a host device and generating a third clock signal based at least in part on modifying a frequency of the second clock signal, where the multi-phase clock is based at least in part on the third clock signal.

Aspect 9: The method, apparatus, or non-transitory computer-readable medium of aspect 8, further including operations, features, circuitry, logic, means, or instructions, or any combination thereof for generating each clock signal of the plurality of clock signals of the multi-phase clock based at least in part on modifying a respective phase of each clock signal of the plurality of clock signals, where the respective phase is based at least in part on the plurality of configurations.

Aspect 10: The method, apparatus, or non-transitory computer-readable medium of any of aspects 1 through 9, further including operations, features, circuitry, logic, means, or instructions, or any combination thereof for selecting, for a plurality of conductive paths of a bus of the memory device, a second set of trim parameters associated with each clock signal of the multi-phase clock based at least in part on a difference between the first frequency and the second frequency.

It should be noted that the aspects described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 11: An apparatus, including: a memory device including a mimic circuit associated with a multi-phase clock including a plurality of clock signals, the memory device operable to: communicate with a low-speed tester, the low-speed tester configured to determine, using the mimic circuit, a first frequency of a first clock signal of the multi-phase clock associated with a first configuration of a plurality of configurations of the mimic circuit and a second frequency of the first clock signal associated with a second configuration of the plurality of configurations; and communicate with a high-speed tester, the high-speed tester configured to select, for each conductive path of a bus of the memory device, a set of trim parameters associated with each clock signal of the multi-phase clock based at least in part on a difference between the first frequency and the second frequency.

Aspect 12: The apparatus of aspect 11, further including: a clock circuit different than the mimic circuit, the memory device further configured to: communicate via the bus of the memory device using the clock circuit, the clock circuit configured using the set of trim parameters.

Aspect 13: The apparatus of aspect 12, where the mimic circuit includes a plurality of circuits configured to implement the multi-phase clock.

Aspect 14: The apparatus of any of aspects 11 through 13, where the low-speed tester is further configured to store an indication of the difference, selecting the set of trim parameters is based at least in part on storing the indication.

Aspect 15: The apparatus of any of aspects 11 through 14, where, to determine the first frequency, the low-speed tester is further configured to: transmit a first command to the memory device to configure the mimic circuit according the first configuration; transmit, based at least in part on the configuring, a second command at a first time to activate the first clock signal; transmit a third command at a second time after the first time to deactivate the first clock signal; and identify a quantity of oscillations of the first clock signal, where the first frequency is based at least in part of the quantity of oscillations and a difference between the first time and the second time.

Aspect 16: The apparatus of any of aspects 11 through 15, where the set of trim parameters includes a third configuration of the plurality of configurations.

Aspect 17: The apparatus of any of aspects 11 through 16, where the high-speed tester is further configured to perform a high-speed testing phase for the memory device to determine the set of trim parameters, selecting the set of trim parameters is based at least in part on the performing.

Aspect 18: The apparatus of any of aspects 11 through 17, where the memory device is further operable to: receive a second clock signal from a host device; and generate a third clock signal based at least in part on modifying a frequency of the second clock signal, where the multi-phase clock is based at least in part on the third clock signal.

Aspect 19: The apparatus of aspect 18, where the memory device is further operable to: generate each clock signal of the plurality of clock signals of the multi-phase clock based at least in part on modifying a respective phase of each clock signal of the plurality of clock signals, where the respective phase is based at least in part on the plurality of configurations.

Aspect 20: The apparatus of any of aspects 11 through 19, where the high-speed tester is further configured to: select, for a plurality of conductive paths of a bus of the memory device, a second set of trim parameters associated with each clock signal of the multi-phase clock based at least in part on a difference between the first frequency and the second frequency.

An apparatus is described. The following provides an overview of aspects of the apparatus as described herein:

Aspect 21: A system, including: a memory device including a mimic circuit associated with a multi-phase clock including a plurality of clock signals; a low-speed tester operable to communicate with the memory device, where the low-speed tester is configured to determine, using the mimic circuit, a first frequency of a first clock signal of the multi-phase clock associated with a first configuration of a plurality of configurations of the mimic circuit and a second frequency of the first clock signal associated with a second configuration of the plurality of configurations; and a high-speed tester operable to communicate with the memory device, the high-speed tester configured to select, for each conductive path of a bus of the memory device, a set of trim parameters associated with each clock signal of the multi-phase clock based at least in part on a difference between the first frequency and the second frequency.

Aspect 22: The system of aspect 21, where the memory device further includes: a clock circuit different than the mimic circuit, the memory device operable to communicate via the bus of the memory device using the clock circuit, the clock circuit configured using the set of trim parameters.

Aspect 23: The system of aspect 22, where the mimic circuit includes a plurality of circuits configured to implement the multi-phase clock.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. A conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or may be an indirect conductive path that includes intermediate components, such as switches, transistors, or other components. In some examples, the flow of signals between the connected components may be interrupted for a time, for example, using one or more intermediate components such as switches or transistors.

A switching component (e.g., a transistor) discussed herein may be a field-effect transistor (FET), and may include a source (e.g., a source terminal), a drain (e.g., a drain terminal), a channel between the source and drain, and a gate (e.g., a gate terminal). A conductivity of the channel may be controlled (e.g., modulated) by applying a voltage to the gate which, in some examples, may result in the channel becoming conductive. A switching component may be an example of an n-type FET or a p-type FET.

The description set forth herein, in connection with the appended drawings, describes example configurations and does not represent all the examples that may be implemented or that are within the scope of the claims. The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Similar components may be distinguished by following the reference label by one or more dashes and additional labeling that distinguishes among the similar components. If just the first reference label is used in the specification, the description is applicable to any one of the similar components having the same first reference label irrespective of the additional reference labels.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Due to the nature of software, functions described herein can be implemented using software executed by a processor, hardware, firmware, hardwiring, or combinations of any of these. Features implementing functions may be physically located at various positions, including being distributed such that portions of functions are implemented at different physical locations.

Illustrative blocks and modules described herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium, or combination of multiple media, that can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or a processor.

The descriptions and drawings are provided to enable a person having ordinary skill in the art to make or use the disclosure. Various modifications to the disclosure will be apparent to the person having ordinary skill in the art, and the techniques disclosed herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

determining, using a mimic circuit of a memory device as part of a low-speed testing phase:

a first frequency of a first clock signal using a first configuration of a plurality of configurations of the mimic circuit, the first clock signal being one of a plurality of clock signals of a multi-phase clock signal, and a second frequency of the first clock signal using a second configuration of the plurality of configurations, wherein the mimic circuit is configured to simulate a behavior of a clock circuit while the mimic circuit is operating at a lower frequency than the clock circuit; and selecting, for a conductive path of a bus of the memory device, a set of trim parameters associated with each clock signal of the multi-phase clock signal based at least in part on a difference between the first frequency and the second frequency.

2. The method of claim 1, further comprising:

communicating via the bus of the memory device using the clock circuit, the clock circuit configured using the set of trim parameters.

3. The method of claim 2, wherein the mimic circuit comprises a plurality of circuits configured to implement the multi-phase clock signal.

4. The method of claim 1, further comprising:

storing an indication of the difference, wherein selecting the set of trim parameters is based at least in part on storing the indication.

5. The method of claim 1, wherein determining the first frequency comprises:

configuring the mimic circuit according to the first configuration;

transmitting, by a tester coupled with the bus of the memory device and based at least in part on the configuring, a first command at a first time to activate the first clock signal;

transmitting, by the tester, a second command at a second time after the first time to deactivate the first clock signal; and identifying a quantity of oscillations of the first clock signal, wherein the first frequency is based at least in part on the quantity of oscillations and a difference between the first time and the second time.

6. The method of claim 1, wherein the set of trim parameters comprises a third configuration of the plurality of configurations.

7. The method of claim 1, further comprising:

performing a high-speed testing phase for the memory device to determine the set of trim parameters, wherein selecting the set of trim parameters is based at least in part on the performing.

8. The method of claim 1, further comprising:

receiving a second clock signal from a host device; and generating a third clock signal based at least in part on modifying a frequency of the second clock signal, wherein the multi-phase clock signal is based at least in part on the third clock signal.

9. The method of claim 8, further comprising:

generating each clock signal of the plurality of clock signals of the multi-phase clock signal based at least in part on modifying a respective phase of each clock signal of the plurality of clock signals, wherein the respective phase is based at least in part on the plurality of configurations.

10. The method of claim 1, further comprising:

selecting, for a plurality of conductive paths of a bus of the memory device, a second set of trim parameters associated with each clock signal of the multi-phase clock signal based at least in part on the difference between the first frequency and the second frequency.

11. The method of claim 1, wherein the mimic circuit is configured to reduce, by a factor, a frequency of an input signal.

12. The method of claim 11, wherein the reduction of the frequency of the input signal corresponds to a quantity of clock circuits included in the mimic circuit.

13. An apparatus, comprising:

a memory device comprising a mimic circuit that is configured to simulate a behavior of a clock circuit while the mimic circuit is operating at a lower frequency than the clock circuit, the memory device operable to:

communicate with a low-speed tester, the low-speed tester configured to determine, using the mimic circuit:

a first frequency of a first clock signal using a first configuration of a plurality of configurations of the mimic circuit, the first clock signal being one of a plurality of clock signals of a multi-phase clock signal, and a second frequency of the first clock signal using a second configuration of the plurality of configurations; and communicate with a high-speed tester, the high-speed tester configured to select, for each conductive path of a bus of the memory device, a set of trim parameters associated with each clock signal of the multi-phase clock signal based at least in part on a difference between the first frequency and the second frequency.

14. The apparatus of claim 13, wherein the memory device is further configured to:

communicate via the bus of the memory device using the clock circuit, the clock circuit configured using the set of trim parameters, wherein the mimic circuit comprises a plurality of circuits configured to implement the multi-phase clock signal.

15. The apparatus of claim 13, wherein:

the low-speed tester is further configured to store an indication of the difference, and selecting the set of trim parameters is based at least in part on storing the indication.

16. The apparatus of claim 13, wherein, to determine the first frequency, the low-speed tester is further configured to:

transmit a first command to the memory device to configure the mimic circuit according to the first configuration;

transmit, based at least in part on the configuring, a second command at a first time to activate the first clock signal;

transmit a third command at a second time after the first time to deactivate the first clock signal; and identify a quantity of oscillations of the first clock signal, wherein the first frequency is based at least in part on the quantity of oscillations and a difference between the first time and the second time.

17. The apparatus of claim 13, wherein:

the high-speed tester is further configured to perform a high-speed testing phase for the memory device to determine the set of trim parameters, and selecting the set of trim parameters is based at least in part on the performing.

18. The apparatus of claim 13, wherein the memory device is further operable to:

receive a second clock signal from a host device; and generate a third clock signal based at least in part on modifying a frequency of the second clock signal, wherein the multi-phase clock signal is based at least in part on the third clock signal.

19. The apparatus of claim 13, wherein the high-speed tester is further configured to:

select, for a plurality of conductive paths of a bus of the memory device, a second set of trim parameters associated with each clock signal of the multi-phase clock signal based at least in part on the difference between the first frequency and the second frequency.

20. A system, comprising:

a memory device comprising a mimic circuit that is configured to simulate a behavior of a clock circuit while the mimic circuit is operating at a lower frequency than the clock circuit;

a low-speed tester operable to communicate with the memory device, wherein the low-speed tester is configured to determine, using the mimic circuit:

a first frequency of a first clock signal using a first configuration of a plurality of configurations of the mimic circuit, the first clock signal being one of a plurality of clock signals of a multi-phase clock signal, and a second frequency of the first clock signal using a second configuration of the plurality of configurations; and a high-speed tester operable to communicate with the memory device, the high-speed tester configured to select, for each conductive path of a bus of the memory device, a set of trim parameters associated with each clock signal of the multi-phase clock signal based at least in part on a difference between the first frequency and the second frequency.

* * * * *